US010247213B2

(12) United States Patent
Schmidt

(10) Patent No.: US 10,247,213 B2
(45) Date of Patent: Apr. 2, 2019

(54) ADJUSTABLE FASTENING DEVICE AND METHOD FOR PRODUCING A PREFABRICATED SUBASSEMBLY FROM AT LEAST ONE ADJUSTABLE FASTENING DEVICE AND A COMPONENT

(71) Applicant: Heiko Schmidt, Lappersdorf (DE)

(72) Inventor: Heiko Schmidt, Lappersdorf (DE)

( * ) Notice: Subject to any disclaimer, the term of this patent is extended or adjusted under 35 U.S.C. 154(b) by 230 days.

(21) Appl. No.: 15/038,877

(22) PCT Filed: Nov. 26, 2014

(86) PCT No.: PCT/DE2014/100415
§ 371 (c)(1),
(2) Date: May 24, 2016

(87) PCT Pub. No.: WO2015/078450
PCT Pub. Date: Jun. 4, 2015

(65) Prior Publication Data
US 2016/0377105 A1    Dec. 29, 2016

(30) Foreign Application Priority Data

Nov. 27, 2013  (DE) .................. 10 2013 113 098
Nov. 28, 2013  (DE) .................. 10 2013 113 154

(51) Int. Cl.
*F16B 5/02*    (2006.01)
*F16B 37/06*   (2006.01)

(52) U.S. Cl.
CPC .......... *F16B 5/0233* (2013.01); *F16B 37/065* (2013.01)

(58) Field of Classification Search
CPC .............................. F16B 5/0233; F16B 5/025
USPC ........................................................ 411/546
See application file for complete search history.

(56) References Cited

U.S. PATENT DOCUMENTS

| 4,043,239 A * | 8/1977 | DeFusco ............... F16B 5/0233 |
| | | 296/187.01 |
| 5,431,517 A * | 7/1995 | Hoelle .................... F01D 25/24 |
| | | 29/512 |
| 6,776,566 B2 * | 8/2004 | Kobusch ............... F16B 5/0283 |
| | | 411/432 |

(Continued)

FOREIGN PATENT DOCUMENTS

| DE | 3620005 C1 | 9/1987 |
| DE | 202005016823 U1 | 2/2006 |
| WO | WO2006/063634 A1 | 6/2006 |

*Primary Examiner* — Flemming Saether
(74) *Attorney, Agent, or Firm* — Welsh, Flaxman & Gitler LLC

(57) ABSTRACT

The invention relates to an adjustable fastening device including at least one sleeve nut having an aperture with a first internal thread and a through-bore following the same along the longitudinal axis of the fastening device (1), and also including a drum screw with an external thread and a tensioning screw lead-through, in the case of which the drum screw engages, by way of the external thread, in the first internal thread of the sleeve nut. According to the invention, the sleeve nut has on the free peripheral region, which forms the opening of the aperture, a rivet-collar portion and a central sleeve portion, which projects into the aperture in the direction of the rivet-collar portion, wherein the tensioning-screw lead-through of the drum screw is designed to accommodate the central sleeve portion at least in part.

13 Claims, 4 Drawing Sheets

(56) References Cited

U.S. PATENT DOCUMENTS

| | | | | |
|---|---|---|---|---|
| 7,025,552 B2* | 4/2006 | Grubert | ............... | F16B 5/025 |
| | | | | 403/409.1 |
| 7,226,263 B2* | 6/2007 | Schwarzbich | ........ | F16B 5/0233 |
| | | | | 403/374.3 |
| 7,891,927 B2* | 2/2011 | Burger | ............... | F16B 5/0233 |
| | | | | 411/383 |
| 8,061,948 B2* | 11/2011 | DeGelis | ............ | F16B 5/0233 |
| | | | | 411/32 |
| 8,066,465 B2* | 11/2011 | Figge | ............... | F16B 5/025 |
| | | | | 411/34 |
| 8,202,033 B2 | 6/2012 | Choi et al. | | |
| 8,827,585 B2* | 9/2014 | Figge | ............... | B62D 25/147 |
| | | | | 403/168 |
| 2009/0263180 A1* | 10/2009 | De Gelis | ............ | F16B 5/0233 |
| | | | | 403/22 |

\* cited by examiner

ADJUSTABLE FASTENING DEVICE AND METHOD FOR PRODUCING A PREFABRICATED SUBASSEMBLY FROM AT LEAST ONE ADJUSTABLE FASTENING DEVICE AND A COMPONENT

BACKGROUND OF THE INVENTION

The invention relates to an adjustable fastening device composed of at least one sleeve nut having an aperture with a first internal thread and a through-bore following the first internal thread along a longitudinal axis (LA) of the adjustable fastening device and to a method for producing a prefabricated subassembly comprising at least one first component made of a flat material from a metal or a plastic, and an adjustable fastening device comprising at least one sleeve nut having an aperture with a first internal thread and a through-bore following the first internal thread along the longitudinal axis (LA) of the adjustable fastening device, and comprising a drum screw with an external thread and a tensioning screw lead-through.

Adjustable fastening devices for fastening at least one component made from flat material to another component, preferably a holding component, at a specified distance from one another are in principle known.

The distance between the component and the holding component is to be settable or adjustable during mounting via such a fastening device. For example, the component is a shaped part which is made by stamping, pressing and/or joining processes, namely preferably in the form of a prefabricated subassembly, and which is provided for receiving the housing wall of a household appliance.

Such adjustable fastening device are normally composed of a sleeve nut which, for accommodating a drum screw, has a cylindrical aperture with a first internal thread running concentrically to the longitudinal axis of the sleeve nut. The drum screw has an external thread which engages in the first internal thread of the sleeve nut. The sleeve nut is non-rotatably fastened with its lower free edge on the top side of the component by welding, namely in such a manner that the sleeve nut encloses a joining opening in the component and that, furthermore, the drum screw therefore can be screwed in or unscrewed from the sleeve nut through the joining opening from the bottom side of the component. The sleeve nut further has a through-bore which is situated opposite the welding edge and has a second internal thread into which a tensioning screw fed through a central tensioning screw lead-through of the drum screw can be screwed by means of its external thread.

For mounting the component on the holding component, first, the drum screw is screwed from the bottom side of the plate-like component into the sleeve nut, namely thus far that the drum screw protrudes downwards and with a predetermined distance beyond the bottom side of the plate-like component. Subsequently, the tensioning screw is first fed through a bore of the holding component and through the tensioning screw lead-through of the drum screw and screwed into the second internal thread of the sleeve nut. In doing so, the flatly formed face side of the drum screw engages on the holding component and due to the resulting friction forces and an appropriate orientation of the thread, co-rotating of the drum screw when tightening the tensioning screw is prevented. The holding component thus is clamped between the screw head of the tensioning screw and the face side of the drum screw and as a result of this, the bottom side of the plate-like component and the holding component has the distance between them that is set via the drum screw. However, it is a disadvantage that welding the sleeve nut to the plate-shaped component is required, which represents an additional time-consuming and cost-intensive work step within the production of prefabricated subassemblies. Also, the drum can be inserted into the sleeve nut only after the welding process, i.e., when mounting the prefabricated subassembly in the course of the series production, there is the disadvantage that the drum screw needs to be supplied and mounted individually.

SUMMARY OF THE INVENTION

Proceeding from the aforementioned art, it is an object of the invention to provide an adjustable fastening device and an associated method for producing a prefabricated subassembly from at least one adjustable fastening device and a component, which eliminates the described disadvantages and, in particular, enables a simple and fast production of prefabricated subassemblies as well as the mounting thereof in the course of a series production.

The substantial aspect of the adjusting screw device, according to the invention, is that the sleeve nut has on the free peripheral region, which forms the opening of the aperture, a rivet collar portion and a central sleeve portion which projects into the aperture in the direction of the rivet collar portion, wherein the tension screw lead-through of the drum screw is designed to accommodate the central sleeve portion at least in part. Particularly advantageously, the design according to the invention of the tension screw lead-through and the central sleeve portion ensures a deeper screwing of the drum screw into the sleeve nut while maintaining the same stability of the screw connection between the sleeve nut and a tensioning screw screwed thereto since the adjustment travel of the tensioning screw required in comparison to a cylindrical aperture and a cylindrical extent of the tensioning screw lead-through according to the prior teachings is ensured. This also ensures that the drum screw is completely accommodated in the sleeve nut so that pre-mounting thereof is possible and that subsequently, the adjustable fastening device pre-mounted in such a manner can be riveted or pressed together with a component preferably in one work step.

In an advantageous embodiment variant, the rivet collar portion is formed in a sleeve-like manner and runs concentrically to the longitudinal axis of the adjustable fastening device. Thus, mounting the adjustable fastening device can be carried in the course of the component production by using stamping tools known per se. In another embodiment variant, the rivet collar portion runs slightly conical towards the outside or inside, namely along the longitudinal axis.

As a further advantage, the central sleeve portion accommodates the through-bore of the sleeve nut and tapers conically in the direction of the free peripheral range along the longitudinal axis. Preferably, the central sleeve portion is formed to be concentric to the longitudinal axis. This allows for fast and reliable establishing of a clamping connection between the drum screw and the sleeve nut while increasing the screw-in depth at the same time.

In a preferred embodiment variant, the tensioning screw lead-through has at least one portion which is conically tapered along the longitudinal axis and is in operative connection with the central sleeve portion. Moreover, a structured portion forming a hexagon socket is provided at a free end. Furthermore, the cross-section of the tensioning screw lead-through can have at least one step, i.e., can be formed in a stepped manner. For this purpose, the cross-section has a cylindrical portion, for example. Preferably, a step is created in the transition region between the conically tapered portion and the cylindrical portion, the edge of the step being used for establishing a clamping connection with the central sleeve portion.

Furthermore, the first internal thread of the sleeve nut and the external thread of the drum screw are advantageously formed as a left-hand thread. The through-bore of the sleeve nut, for example, has a second internal thread, which is formed as a right-hand thread. Hereby, the thread of a tensioning screw, which likewise is a right-hand thread, can be brought into engagement with the second internal thread of the sleeve nut without any problems. As an alternative, a self-tapping tensioning screw can be used in a through-bore without thread. Co-rotating of the drum screw, when screwing in the tensioning screw, can be effectively prevented in this way.

In an embodiment variant of the invention, driving device, for example in the form of a driving sleeve, an adhesive or similar suitable driving device for accommodating a tensioning screw can be accommodated in the tensioning screw lead-through, wherein the torque required for penetrating the driving device by means of the tensioning screw is greater than the release torque required for releasing the clamped fastening of the drum screw in the sleeve nut. Furthermore, the driving device is advantageously formed such that the toque required for penetrating the driving device by means of the tensioning screw is lower than the friction torque occurring upon contact between the free face-side end of the drum screw and the second component.

Likewise, subject matter of the invention is a prefabricated subassembly, comprising at least one component that is preferably made of a flat material from metal or plastics, and an adjustable fastening device as well as a method for producing such a prefabricated subassembly.

The expressions "approximately", "substantially" or "about" in the spirit of the invention mean deviations from the respective exact value of +/−10%, preferably +/−5% and/or deviations in the form of changes that are irrelevant for the function.

BRIEF DESCRIPTION OF THE DRAWINGS

The invention is explained below in greater detail by means of exemplary embodiments with reference to the figures. In the figures.

DETAILED DESCRIPTION OF THE INVENTION

Figure 1:
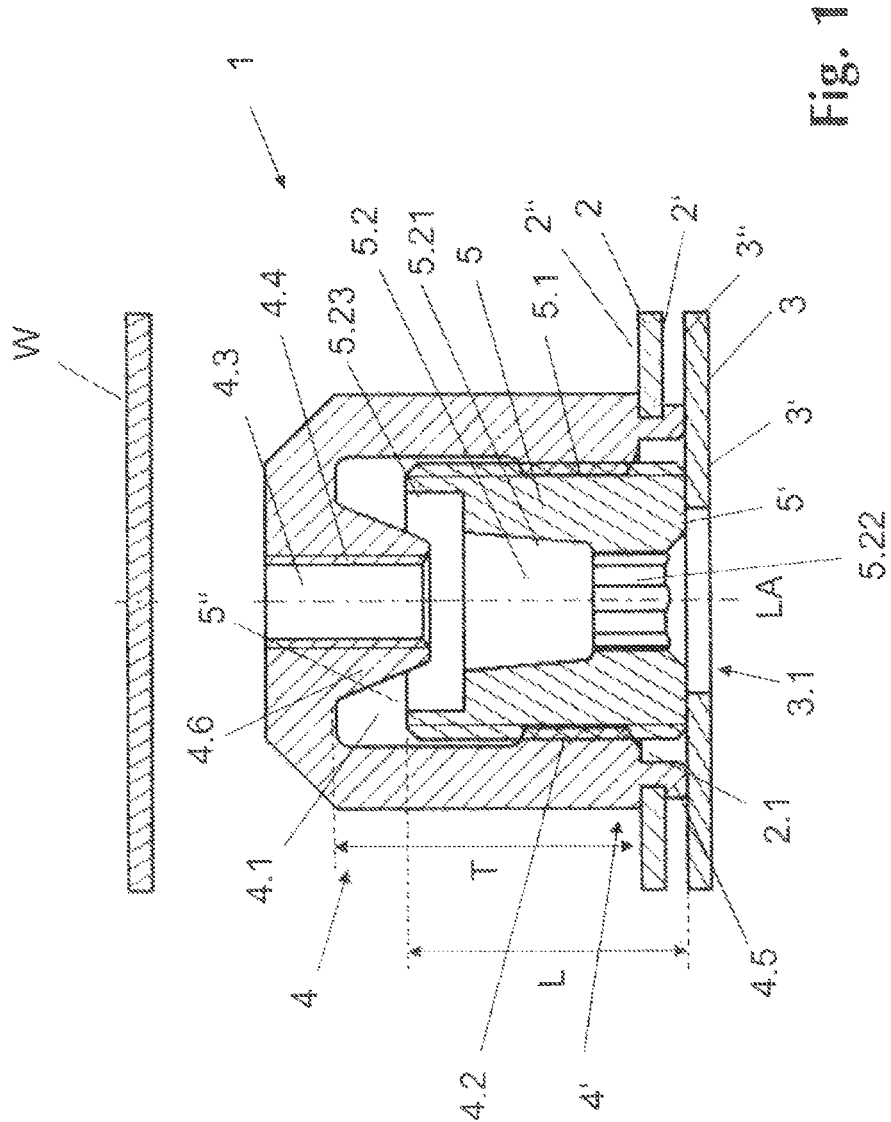
FIG. 1 shows a schematic cross-sectional view through an adjustable fastening device according to the invention which is connected to a first component by rivets, with a second component engaging thereon.
Figure 2:
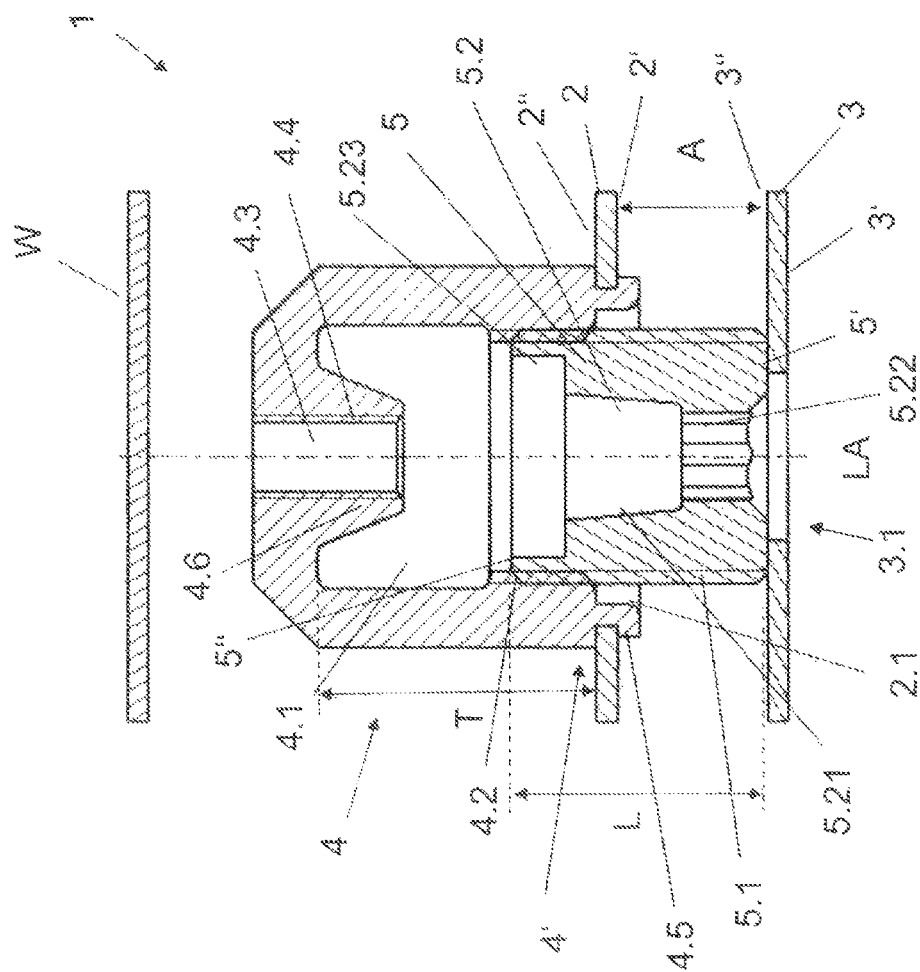
FIG. 2 shows a schematic cross-sectional view through an adjustable fastening device according to the invention which is connected to a first component by rivets, with a second component being spaced apart therefrom.

In the FIGS. 1 to 4, an adjustable fastening device designed according to the invention which is non-rotatably connected to a first component 2 which is flat at least in certain sections is in each case designated by 1. The adjustable fastening device 1 is provided for establishing a connection between the first component 2, which is flat at least in certain sections, and a second component 3, which likewise is flat at least in certain sections, at a specified distance A. FIGS. 1 to 4 show in each case a schematic longitudinal section through the adjustable fastening device 1 in different section planes which run parallel to one another and which run in or parallel to the longitudinal axis LA of the adjustable fastening device 1.

Both the first component 2 and the second component 3 are preferably made of a flat material from metal or plastics, for example from sheet steel, and can be parts of a holder for a housing wall or a support frame of an appliance or a machine, in particular of a household appliance such as a stove or a washing machine. The housing wall W to be fastened is indicated in the FIGS. 1 to 3, for example.

In the figures, the first and the second component 2, 3 are in each case illustrated only in cross-section in order to illustrate the distance A between them in the region of the adjustable fastening device 1 designed according to the invention. The first component 2 is preferably designed as a pressed part, stamped part and/or join part, which can be part of a prefabricated subassembly, which is preferably produced in one work step. Such prefabricated subassemblies are used in series production of machines and appliances in order to reduce the number of manufacturing steps in this manner.

The fastening device 1 which is adjustable according to the invention enables fastening the first and the second components 2, 3 at a predetermined distance A, which is adjustable, for example, between 1 mm and 8 mm, preferably between 2 mm and 6 mm.

For this purpose, the adjustable fastening device 1 comprises at least one sleeve nut 4 having an aperture 4.1 with a first internal thread 4.2 and a through-bore 4.3 following the same along the longitudinal axis LA, and also comprising a drum screw 5 with an external thread 5.1 and a tensioning screw lead-through 5.2. The sleeve nut 4 and the drum screw 5 are preferably made of steel, in particular stainless steel. Also, the through-bore 4.3 can have a second internal thread 4.4 which is provided for screwing in a tensioning screw 6. When using, for example, a self-tapping screw 6, the second internal thread 4.4 can also be omitted.

In the mounted state, the external thread 5.1 of the drum screw 5 is in engagement with the first internal thread 4.2 of the sleeve nut 4 and is accommodated in the aperture 4.1 at least in certain sections. The aperture 4.1 preferably has an aperture depth T which enables a complete accommodation of the drum screw 5 in the aperture 4.1. For this purpose, the length L of the drum screw 5 is selected to be less than the aperture depth T, wherein the aperture depth T in the meaning of the invention is to be understood as the point of the aperture 4.1 that has the greatest distance from the free face-side peripheral region 4' which encloses the opening of the aperture 4.1 and which is non-rotatably connected to the first component 2.

For this purpose, the sleeve nut 4 has a rivet collar portion 4.5 which is located at the free face-side peripheral region 4' enclosing the opening of the aperture 4.1 and which runs concentric to the longitudinal axis LA and extends downwards along the longitudinal axis LA. The rivet collar portion 4.5 is preferably formed in a sleeve-like manner. Furthermore, the rivet collar portion 4.5 has a wall thickness which is reduced compared to the adjoining sleeve wall of the sleeve nut 4 so that the result is a step-like transition between the outer and/or inner surface of the sleeve nut 4 and the rivet collar portion 4.5 on which the edge of a joining opening 2.1 in the first component 2 engages. The joining opening 2.1 is dimensioned in such a manner that the sleeve-like rivet collar portion 4.5 can be led through and that the stepped peripheral region 4' is supported on the top side 4" of the first component 2. Also, the rivet collar portion 4.5 can be slightly conically tapered towards the inside or the outside along the longitudinal axis LA.

According to the invention, the rivet collar portion 4.5 is led with its rivet collar portion 4.5 through the joining opening 2.1 so as to be non-rotatably fastened to the first component 2 and is permanently deformed in such a manner that the rivet collar portion 4.5 protruding beyond the bottom side 2' of the first component 2 is deformed radially outwards with respect to the longitudinal axis LA and thus engages on the bottom side 2' of the first component 2. In each of the FIGS. 1 to 4, the sleeve-like rivet collar portion 4.5 is illustrated being already deformed. The latter engages on the bottom side 2' of the first component 2 and thus engages around the edge of the joining opening 2.1. A part of the deformed rivet collar portion 4.5 thus projects slightly downwards from the bottom side 2' of the first component 2, i.e., direct engagement of the bottom side 2' of the first component 2 on the top side 3" of the second component 3 is not provided. Advantageously, this also specifies the minimum amount of the distance A, which may not be undercut.

Figure 4:
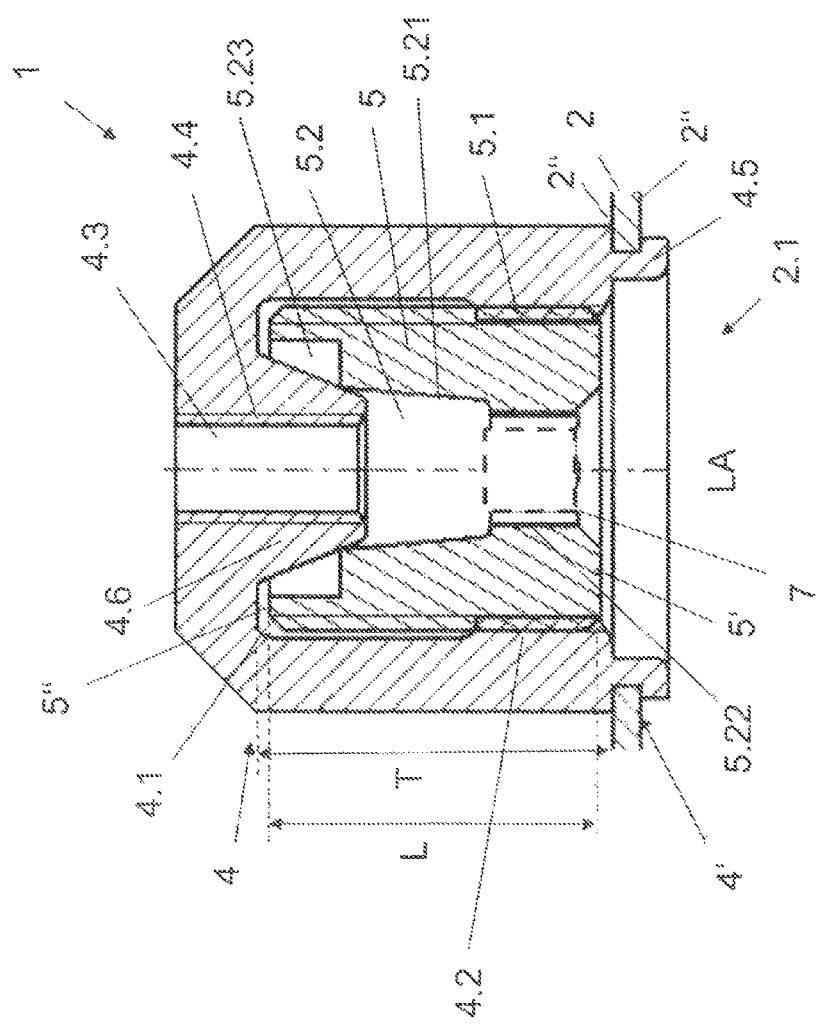
FIG. 4 shows a schematic cross-sectional view through an adjustable fastening device according to the invention which is connected to a first component by rivets, with the drum screw being accommodated completely.

According to the invention, fastening the sleeve nuts 4 on the first component 2 for producing a pre-fabricated subassembly is carried out by means of clinch rivets or wobble rivets, namely preferably in one work step. Prior to carrying out the riveting process, the drum screw 5 is already screwed into the aperture 4.1 of the sleeve nut 4, namely in such a manner that, as illustrated in FIG. 4, the drum screw 5 is accommodated completely in the aperture 4.1 of the sleeve nut 4. Hereby, the lower free end 5' preferably lies above the stepped peripheral region 4' of the sleeve nut 4. Thus, the prefabricated subassembly particularly advantageously includes already the drum screw 5 required for mounting. Also, the first component 2, in particular when implemented in the form of sheet steel, can have a diameter which, in the region of the joining opening 2.1, is partially or entirely smaller than the largest diameter of the rivet collar portion 4.5, and fastening can then be carried out by means of a press-in operation.

According to the invention, the sleeve nut 4 has a central, conically tapered sleeve portion 4.6 which projects into the aperture 4.1 in the direction of the rivet collar portion 4.5 and which is formed concentric to the longitudinal axis LA and accommodates the through-bore 4.3 together with the second internal thread 4.4. In the drum screw 5 there is provided a tensioning screw lead-through 5.2 which corresponds to the outer shape of the central sleeve portion 4.6 at least in certain sections and which is designed for accommodating the central sleeve portion 4.6 of the sleeve nut 4 at least in certain sections. When screwing the drum screw 5 completely into the sleeve nut 4, a clamping connection can preferably be established so that the drum screw 5 is captively accommodated in the sleeve nut 4.

For this purpose, the tensioning screw lead-through 5.2 of the drum screw 5 has at least one conically tapered portion 5.21 in which the diameter of the tensioning screw lead-through 5.2 increases along the longitudinal axis LA in the direction of the central sleeve portion 4.5. The conically tapered portion 5.21 of the tensioning screw lead-through 5.2 of the drum screw 5 is adjoined at the drum screw's 5 end 5' opposite the central sleeve portion 4.5 by a structured portion 5.2 forming a hexagon socket of the tensioning screw lead-through 5.2, via which screwing in and unscrewing of the drum screw 5 is possible by means of an Allen key. At the drum screw's 5 end 5" opposite the hexagon socket, the conically tapered portion 5.21 is followed by a portion 5.23 of the tensioning screw lead-through 5.2 which has a cylindrical cross-section with a diameter that is significantly larger compared to the conically tapered portion 5.21 so that a step range of the tensioning screw lead-through 5.2 is created. The described, in particular, stepped design of the tensioning screw lead-through 5.2 of the drum screw 5 and the central sleeve portion 4.6 of the sleeve nut 4 advantageously enables to completely accommodate the drum screw 5 in the sleeve nut 5 without the need to increase the length of the sleeve nut 4. For manufacturing-related reasons, the length of the sleeve nut 4 should not exceed 20 mm, wherein the distance A is preferably adjustable between 1 mm and 8 mm.

Figure 3:
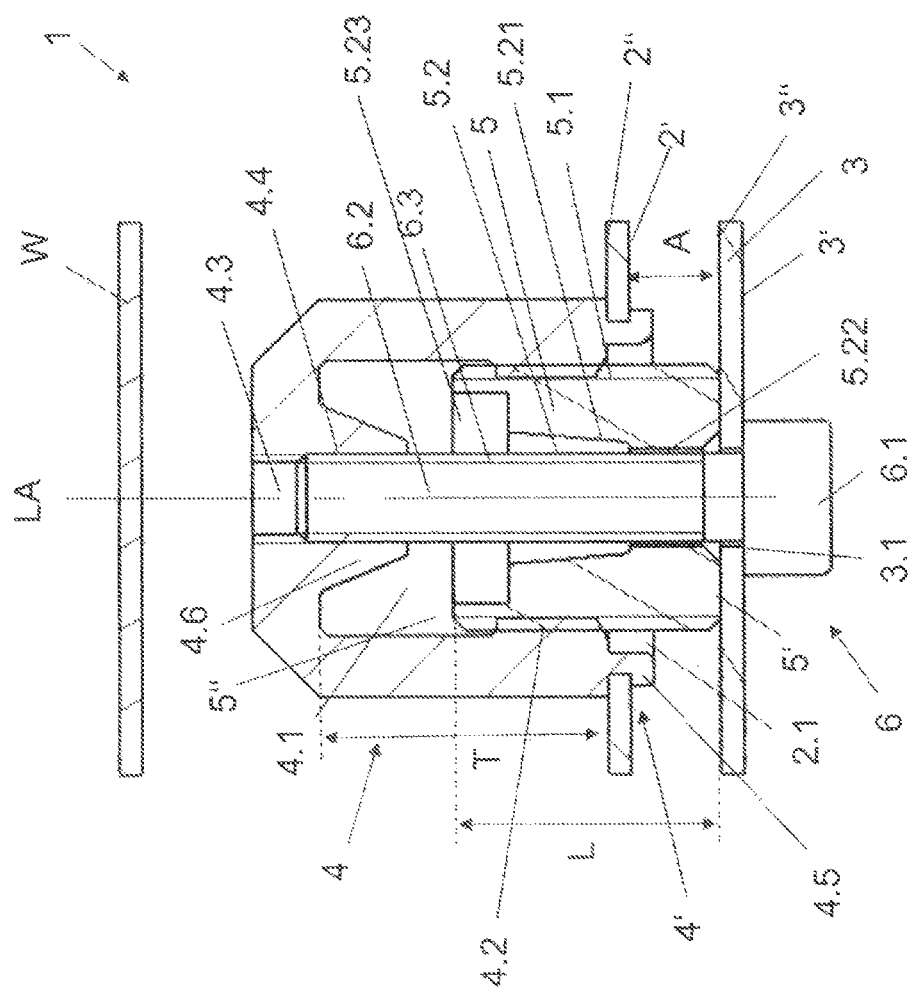
FIG. 3 shows a schematic cross-sectional view through an adjustable fastening device according to the invention which is connected to a first component by rivets, with a second component being mounted spaced apart thereto by means of a tensioning screw.

Furthermore, the second internal thread 4.4 of the sleeve nut 4 is designed for accommodating a tensioning screw 6 which has a screw head 6.1 and an adjoining screw shank 6.2 with an external thread 6.3. The tensioning screw 6 is designed, for example, as a cylinder screw or hexagon screw. For example, FIG. 3 shows a schematic cross-section of a tensioning screw 6 that is accommodated in the fastening device 1.

The first internal thread 4.2 of the sleeve nut 4 and the external thread 5.1 of the drum screw 5 are preferably formed by a left-hand thread, whereas the second internal thread 4.4 of the sleeve nut 4 and the external thread 6.3 of the tensioning screw 6 are implemented as a right-hand thread.

Hereinafter, the method according to the invention for producing a prefabricated subassembly from at least one adjustable fastening device 1 and a first component 2 is described.

The prefabricated subassembly, which is not illustrated in the figures, is preferably produced in one work step by a plurality of pressing stamping and/or joining operations. For this purpose, first, at least one joining opening 2.1 is provided in the first component 2 which is made of a flat material from metal or plastics. Furthermore, at least one adjustable fastening device 1 is fed to the component 2, namely into the joining opening 2.1 in the manner as described above. The adjustable fastening device 1 comprises the sleeve nut 4 and the drum screw 5, which is accommodated therein and which is completely screwed into the aperture 4.1, and due to the configuration according to the invention of the tensioning screw lead-through 5.2 of the drum screw 5 and the central sleeve portion 4.6 engaging therein, the drum screw is fastened by clamping. Thus, the drum screw 5 is captively pre-mounted in sleeve nut 4.

The adjustable fastening device 1 pre-mounted in this manner is inserted with the rivet collar portion 4.5 into the joining opening 2.1, namely in such a manner that the peripheral region 4' of the sleeve nut 4 rests on the top side 2" of the first component 2. By means of a suitable punch-like tool that is inserted from the bottom side 2' of the first component 2 into the sleeve-like rivet collar portion 4.5, the still undeformed sleeve-like rivet collar portion 4.5 is then permanently deformed, namely in such a manner that it engages around the edge of the joining opening 2.1, whereby the sleeve nut 4 is captively fixed on the first component 1. Also, pressing in the pre-mounted adjustable fastening device 1 in the region of the joining opening 2.1 can be carried out.

In the case of the subassembly prefabricated in such a manner, the clamped fastening of the drum screw 5 in the sleeve nut 5 mounted to the first component 2 is released in the course of the series production, preferably by using an Allen key. By adequately screwing the drum screw 5 out of the sleeve nut 4, the distance A between the first and second components 2, 3 is adjusted. For this purpose, the drum screw's 5 free end 5', which projects downwards from the bottom side 2' of the first component 2 and protrudes beyond the deformed rivet collar portion 4.5, is brought in engagement with the second component 3, namely with the top side 3" thereof. Here, the tensioning screw lead-through 5.2 is aligned with a mounting or fastening bore 3.1 provided in the second component 2 for accommodating and leading through the tensioning screw 6, which is led through the mounting or fastening bore 3.1, the adjoining tensioning screw lead-through 5.2 of the drum screw 5 to the through-bore 4.2 of the sleeve nut 4, so that the external thread 6.3 thereof can be brought into engagement in the second internal thread 4.4 of the sleeve nut 4. By screwing in the tensioning screw 6, the second component 2 is biased between the free end 5' of the drum screw 5 and the screw head 6.1 of the tensioning screw 6 and is thereby fixed. For this purpose, the screw head 6.1 rests against the bottom side 3' of the second component 3.

In an embodiment variant of the invention, which is not illustrated in the figures, driving device 7, for example in the form of a driving sleeve, an adhesive or a similarly suitable driving device can be accommodated in the through-bore 5.2, for example in the region of the structured portion 5.2 forming a hexagon socket. When using a driving sleeve, the same is preferably made from plastics. The driving device 7 are designed such that the torque required for penetrating the driving device 7 by means of the tensioning screw 6 is greater than the release torque required for releasing the clamped fastening of the drum screw 5 in the sleeve nut 4, so that when screwing in the tensioning screw 6 in clockwise direction, the drum screw 5 is first screwed out of the sleeve nut 4, namely until the latter is brought into engagement with the second component 3 and the desired distance A is obtained. Due to the resulting frictional torque between the free face-side end 5' of the drum screw 5 and the second component 2, the torque required for rotating through the driving device 7 is reached and the external thread 6.3 of the tensioning screw 6 is brought into engagement with the second internal thread 4.4 of the sleeve nut 4, i.e., the drum screw 5 is biased with the second component 2 via the tensioning screw 6. For this purpose, the torque required for penetrating the driving device 7 is selected to be lower than the resulting frictional torque between the drum screw 5 and the second component 2. Advantageously, untightening the pre-mounted drum screw 5, adjusting the specified distance A and biasing the adjustable fastening device 1 can thereby be carried out in one work step.

In another embodiment variant, which is not illustrated in the figures, the length L of the drum screw 5 exceeds the aperture depth T of the sleeve nut 4, i.e., the lower free end 5' of the drum screw 5 protrudes beyond the undeformed rivet collar portion 4.5 towards the outside. For deforming the rivet collar portion 4.5 for captively fastening the sleeve nut 4 to the first component 2, a riveting tool, in particular a riveting punch is used, which has a face-side aperture or recess which preferably has a circular cross-section and the aperture depth of which is adapted to the outwardly protruding length portion of the drum screw 5. Thus, when deforming the rivet collar portion 4.5, the protruding free end 5' of the drum screw 5 is accommodated in the face-side aperture or recess of the riveting tool, in particular of the riveting punch. Therefore, deforming the rivet collar portion 4.5 is possible without any problems, even if the drum screw 5 is not completely accommodated in the drum screw 5. Hereby, the entire height of the adjustable fastening device 1 can be further reduced in an advantageous manner, i.e., in addition to a reduction of the installation height, this results also in cost savings due to the reduced material consumption.

The invention has been described above by means of exemplary embodiments. It will be appreciated, that numerous changes and modifications are possible without departing from the inventive concept underlying the invention.

REFERENCE LIST

1 adjustable fastening device
2 first component
2' bottom side
2" top side
2.1 joining opening
3 second component
3' bottom side
3" top side
3.1 mounting or fastening bore
4 sleeve nut
4' free peripheral region
4.1 aperture
4.2 first internal thread
4.3 through bore
4.4 second internal thread
4.5 rivet collar portion
4.6 central sleeve portion
5 drum screw
5', 5" free ends
5.1 external thread
5.2 tensioning screw lead-through
5.21 conically tapered portion
5.22 structured portion
5.23 cylindrical portion
6 tensioning screw
6.1 screw head
6.2 screw shank
6.3 external thread
7 driving device
A distance
L length of the drum screw
LA longitudinal axis
T aperture depth
W housing wall

The invention claimed is:

1. A method for producing a prefabricated subassembly, comprising at least one first component made of a flat material from a metal or a plastic, and an adjustable fastening device comprising a sleeve nut having an aperture with a first internal thread and a through-bore following the first internal thread along a longitudinal axis (LA) of the adjustable fastening device, and comprising a drum screw with an external thread and a tensioning screw lead-through, and a rivet collar portion of the sleeve nut has a wall thickness which is reduced compared to an adjoining sleeve wall of the sleeve nut resulting in a stepped configuration-transition between an outer surface of the sleeve nut and the rivet collar portion at a free face-side end peripheral region of the sleeve nut, wherein the sleeve nut and the drum screw are made of steel comprising the steps of:

providing at least one joining opening in the at least one first component, pre-mounting the adjustable fastening device by screwing the drum screw completely into the sleeve nut to form a pre-mounted adjustable fastening device, feeding the pre-mounted adjustable fastening device to the at least one joining opening, and non-rotatably and captively fastening the sleeve nut of the pre-mounted adjustable fastening device with the at least one first component in the at least one joining opening by a press-in operation, by at least one clinch rivet or by at least one wobble rivet wherein the sleeve nut has on a free peripheral region, which forms an opening of the aperture of the rivet collar portion enclosing the opening of the aperture and the rivet collar portion runs concentric to the longitudinal axis (LA).

2. The method for producing a prefabricated subassembly according to claim 1, wherein a central sleeve portion accommodates the through-bore of the sleeve nut.

3. The method for producing a prefabricated subassembly according to claim 1, wherein a central sleeve portion is formed to be concentric to the longitudinal axis (LA).

4. The method for producing a prefabricated subassembly according to claim 1, wherein the tensioning screw lead-through has at least one portion that is conically tapered along the longitudinal axis (LA).

5. The method for producing a prefabricated subassembly according to claim 1, wherein at a free end, the tensioning screw lead-through has a structured portion that forms a hexagon socket.

6. The method for producing a prefabricated subassembly according to claim 1, wherein the tensioning screw lead-through has at least one cross-section that is formed in a stepped manner.

7. The method for producing a prefabricated subassembly according to claim 1, wherein the aperture is for completely accommodating the drum screw.

8. The method for producing a prefabricated subassembly according to claim 1, wherein the first internal thread of the sleeve nut and the external thread of the drum screw have a left-hand thread.

9. The method for producing a prefabricated subassembly according to claim 1, wherein the through-bore has a second internal thread, which is a right-hand thread.

10. The method for producing a prefabricated subassembly according to claim 1 wherein a driving device for accommodating a tensioning screw is provided in the tensioning screw lead-through, wherein a torque required for penetrating the driving device of the tensioning screw is greater than a release torque required for releasing a clamped fastening of the drum screw in the sleeve nut.

11. The method for producing a prefabricated subassembly according to claim 10, wherein the torque required for penetrating the driving device created by the tensioning screw is lower than a friction torque occurring upon contact between a free face-side end of the drum screw and the second component.

12. The method for producing a prefabricated subassembly according to claim 10, wherein the driving device is formed by a driving sleeve or an adhesive.

13. The method for producing a prefabricated subassembly according to claim 1, wherein the sleeve nut and the drum screw are for establishing a clamping connection between the tensioning screw lead-through and a central sleeve portion.

* * * * *